(12) United States Patent
Babutzka et al.

(10) Patent No.: US 7,100,094 B2
(45) Date of Patent: Aug. 29, 2006

(54) CAUSE-SPECIFIC AND NETWORK-WIDE ERROR ANALYSIS IN DATA PROCESSING JOB MANAGEMENT

(75) Inventors: Dieter Babutzka, Muehlhausen-Rettigheim (DE); Hans-Georg Klotzek, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 465 days.

(21) Appl. No.: 10/209,956

(22) Filed: Jul. 31, 2002

(65) Prior Publication Data

US 2004/0025092 A1 Feb. 5, 2004

(51) Int. Cl.
*G06F 11/00* (2006.01)
*G06F 9/46* (2006.01)

(52) U.S. Cl. ............ 714/48; 718/101; 718/106
(58) Field of Classification Search .......... 714/48; 718/101, 106
See application file for complete search history.

(56) References Cited

U.S. PATENT DOCUMENTS

| | | | | |
|---|---|---|---|---|
| 5,465,354 A | * | 11/1995 | Hirosawa et al. | 718/106 |
| 5,978,830 A | * | 11/1999 | Nakaya et al. | 718/102 |
| 6,041,425 A | * | 3/2000 | Kokunishi et al. | 714/37 |
| 2003/0005023 A1 | * | 1/2003 | Gilbert et al. | 709/101 |
| 2003/0120709 A1 | * | 6/2003 | Pulsipher et al. | 709/106 |
| 2004/0025163 A1 | * | 2/2004 | Babutzka et al. | 718/106 |

FOREIGN PATENT DOCUMENTS

EP   0457109 A2   11/1991

OTHER PUBLICATIONS

"Routing Logged Errors In AIX"; *IBM Technical Disclosure Bulletin, IBM Corporation*; Armonk, NY; vol. 32, No. 6A; Nov. 1989; pp. 192-193.

* cited by examiner

*Primary Examiner*—Robert Beausoliel
*Assistant Examiner*—Christopher McCarthy
(74) *Attorney, Agent, or Firm*—Fish & Richardson P.C.

(57) ABSTRACT

Methods, systems and computer program products for error analysis in case of job failure for network job management. A computer system has at least a first computer and a second computer. The computer system provides a job net. The job net defines the start of a second job in the second computer to be dependent on the completion of a first job in the first computer. The computer system determines a job net status of the job net. In case of unsuccessful termination of the first job the computer system transmits the job net status to the second computer.

17 Claims, 3 Drawing Sheets

CAUSE-SPECIFIC AND NETWORK-WIDE ERROR ANALYSIS IN DATA PROCESSING JOB MANAGEMENT

BACKGROUND OF THE INVENTION

The present invention relates to job management in computer networks.

Computer networks often include multiple computer systems. Typically, each computer system has a technical system administrator who is responsible for all kinds of technical issues related to the computer system. For example, a technical system administrator takes care of user authorizations, setting up tape-mounts, system backup, database reorganization, and so on. Many of these tasks are performed by so-called batch jobs (which will be referred to simply as "jobs"). A job is typically run in the background at a time where the system load through processes that interact with users is low. For example, a scheduler of a computer system performs the task of starting a job when a predefined start condition is fulfilled. In many cases a second job cannot start before a first job has ended because the first job generates output data needed as input for the second job. A problem can occur when the first job dies before having generated all output data. In this case the second job will not receive all required input data. For example, a job can die because of a missing user authorization or a failed tape-mount. The technical system administrator will then be notified and will fix the error.

In the case of a computer network, dependencies between multiple batch-jobs of different computer systems usually exist. That is, for example, a job in a first computer system should not start before successful completion of a job in a second computer system. Usually, a network scheduler is used to control the start and end of various jobs in different computer systems at the computer network level. Typically, in a computer network that is used for business purposes, a business oriented administrator is responsible for the network scheduler. The business oriented administrator is notified when a job from the first computer system dies and, therefore, a dependent job in the second system does not start. However, the technical administrator of the second system is only notified that the dependent job did not start as scheduled.

SUMMARY OF THE INVENTION

The present invention provides methods and apparatus, including computer program products, for cause-specific and network wide error analysis.

In general, in one aspect, the invention provides methods and computer program products for error analysis in case of job failure in a computer system having at least a first computer and a second computer. A method includes the actions of providing a job net, wherein the job net defines the start of a second job of the second computer to be dependent on the completion of a first job in the first computer; determining a job net status of the job net; and, in case of unsuccessful termination of the first job, transmitting the job net status to the second computer. The invention can be implemented to include one or more of the following advantageous features. Determining the job net status is performed at a predefined synchronization point of the job net. A job failure alert is created on the second computer.

In general, in another aspect, the invention provides methods and computer program products for error analysis in case of job failure in a computer system having at least a first computer and a second computer. A method includes receiving in the second computer a job net status of a job net, where the job net defines the start of a second job in the second computer to be dependent on the successful completion of a first job in the first computer; and determining whether the job net status indicates the unsuccessful termination of the first job and, if it does, creating a job failure alert on the second computer.

In general, in another aspect, the invention provides a computer system for error analysis in case of job failure. The computer system has at least a first computer and a second computer and includes a memory storing a job net, where the job net defines the start of a second job in the second computer to be dependent on the completion of a first job in the first computer; and a processor configured to determine a job net status of the job net, and, in case of unsuccessful termination of the first job, to transmit the job net status to the second computer. The system can be implemented to include one or more of the following advantageous features. The processor is configured to determine the job net status at a predefined synchronization point of the job net. The second computer is configured to create a job failure alert.

In general, in another aspect, the invention provides a second computer in a computer system for error analysis in case of job failure. The computer system has at least a first computer, and the second computer includes a memory configured with a job net status of a job net, wherein the job net defines the start of a second job in the second computer to be dependent on the completion of a first job in the first computer, the job net status indicating the unsuccessful termination of the first job; and a processor configured to create a job failure alert on the second computer.

The invention can be implemented to realize one or more of the following advantages. A system in accordance with the invention improves error analysis. The system provides cause-specific reports that indicate the status of jobs for an entire network. The system can provide to a system administrator of one computer system status information about other computer systems of the computer network. For example, the system can notify the system administrator of one computer system about the failure of jobs in the computer system as well as the failure of jobs in another computer system. The system can indicate dependencies at a network level, at a system level, or at both levels. In addition to being able to detect failures, the system can detect errors, such as one that occurs when the second job does not receive all of the needed input data from the first job because, e.g., the first job fails. When such error occurs, the technical system administrator of the computer system is notified of the failure of the first job and the error in the second job. The system notifies the network administrator and the system administrator of the failure and the error, thus providing a comprehensive status report. The system can designate instances during a task when checking status of jobs is needed to prevent failures and error.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

A system in accordance with the invention includes a job net and a network scheduler. The job net includes representations of jobs to be executed in computers communicating over a data communications network and, furthermore, defines the sequence of jobs by having a representation of a start condition for each job. A start condition can include dependencies on various jobs across multiple computers of a computer system. Optionally, the job net can include representations of synchronization points, which indicate when a status check is needed, as will be described later. The jobs and their interdependencies can be seen as a hierarchy in which nodes represent the jobs and synchronization points, if any, and connectors connecting the nodes represent the dependencies. The job net can be implemented with data structures that directly model such a hierarchy, or in any other way—for example, in a tabular form—that can maintain the necessary relationship and status information.

The job net is used as a store and source for job status information at the network level and at the system level. The job net provides job status information to the network scheduler, which manages jobs based on information provided by the job net. The system optionally provides job status information to administrators of all levels, including a system administrator and a network administrator. The information provided can include status for jobs at the network level, at the system level, or at both levels.

Figure 1:
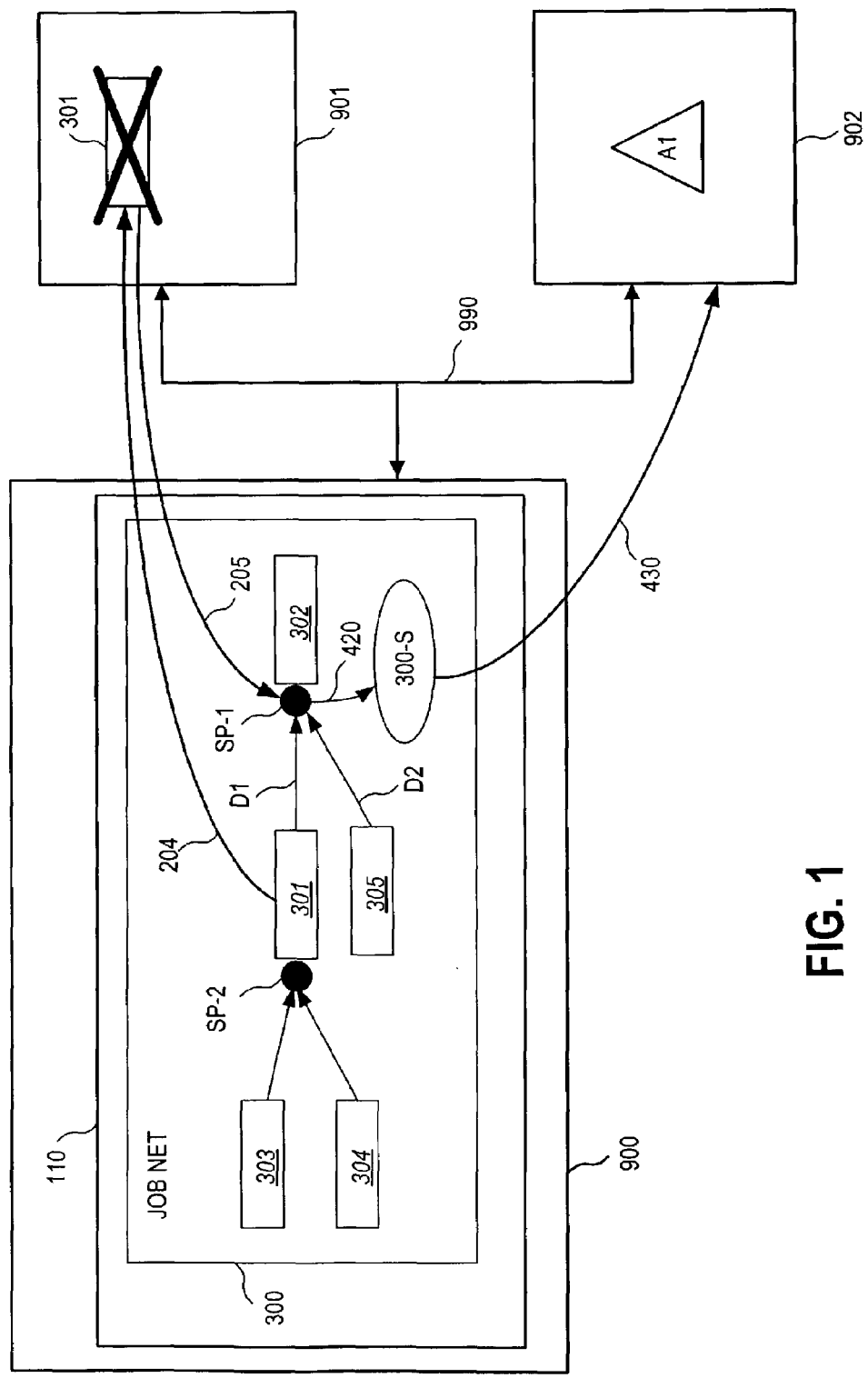
FIG. 1 is a block diagram illustrating an implementation of a job net in accordance with the invention.

FIG. 1 illustrates a job net 300 in one implementation of the invention. The job net 300 represents jobs to be executed in a computer system and dependencies of these jobs. In this example, the computer system includes a first computer 900, a second computer 901, and a third computer 902. The computers 900, 901, and 902 are connected with each other through a network 990. The job net 300 can be stored on the first computer 900, for example, in a memory device. In this implementation, the job net 300 is implemented as part of a network scheduler 110 that schedules and starts jobs in the computer system. Alternatively, the job net 300 can be implemented separately on any computer of the computer system. The job net 300 can be implemented, for example, as a table in a relational database system.

As shown in FIG. 1, the job net 300 includes representations of jobs 301–305 and dependencies of these jobs. Represented by a straight arrow in FIG. 1, a dependency indicates that starting a job depends on the completion of another job. For example, the second job 302 has a dependency D1 on the first job 301 and a dependency D2 on the fifth job 305. According to these dependencies, the second job 302 can only start after the first job 301 and the fifth job 305 are completed. For convenience, the following discussion is restricted to the dependency D1, but applies to other dependencies as well. The following scenario is only an example scenario for discussing different aspects of the invention.

Figure 2:
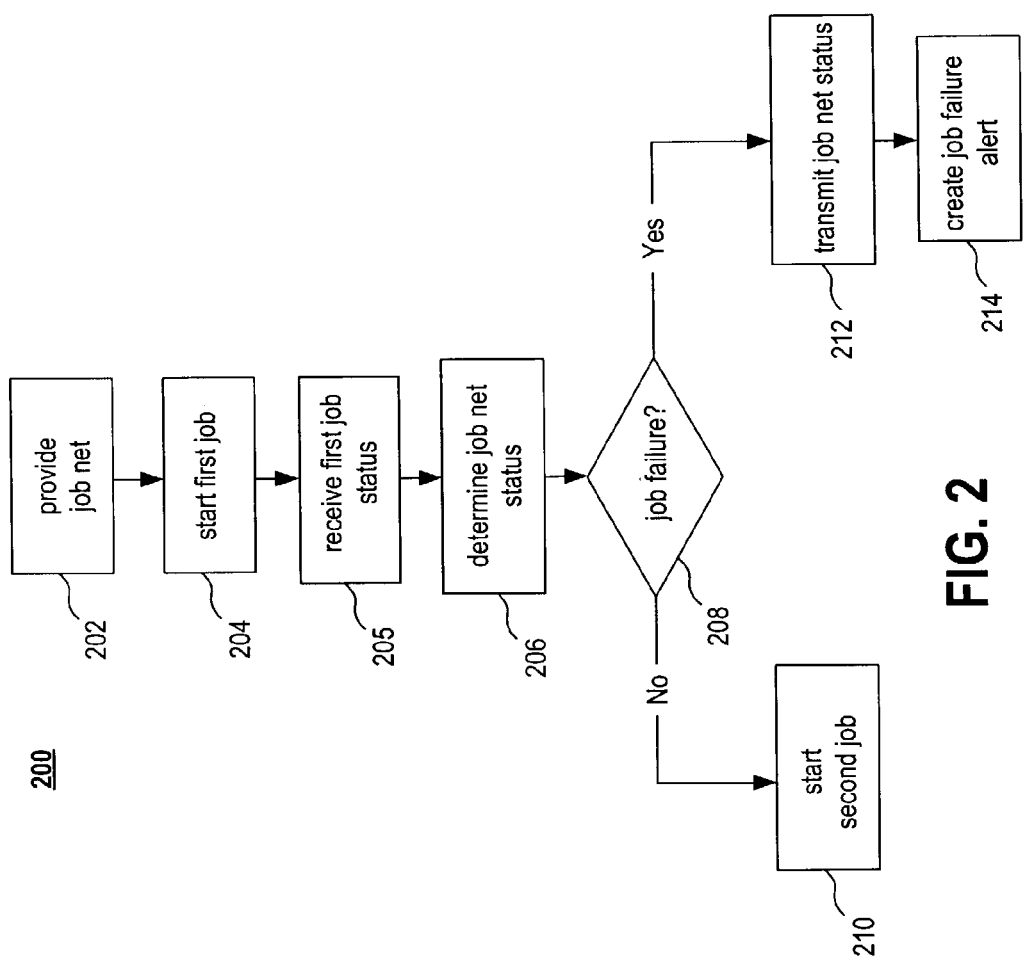
FIG. 2 is a flowchart showing a method for creating a job failure alert in one implementation of the invention.

In the example scenario, shown in FIG. 2, the network scheduler 110 starts the first job 301 on the first computer 901 (step 204). As illustrated by a crossed out block in FIG. 1, the first job 301 fails while running on the first computer 901. The failure can result from any of a variety of causes. For example, a user of the first computer 901 tries to start the first job 301 without authorization; or the first job 301 tries to mount a tape and fails. The first job 301 reports a job failure that is received by the network scheduler 110 (step 205).

As shown in FIG. 1, the job net 300 can include representations of synchronization points, such as SP-1 and SP-2. Synchronization points are inserted in a job net by a person who creates or maintains the job net. A synchronization point is a predefined location in the hierarchy or logical flow of the job net 300 where a status of the job net 300 can be determined. In the example of FIG. 1, the synchronization point SP-1 is defined to determine (step 420, FIG. 4) a job net status 300-S at the node of starting the second job 302 on the second computer 902. This means that after the normal or abnormal termination of the first and fifth jobs 301 and 305, the network scheduler 110 determines the status of all jobs in the job net that have run up to that time. This information is obtained from the computers, for example, from a batch control process, where the jobs were run. The job net status 300-S can include all available status information in the job net 300 at the time the synchronization point SP-1 is reached. The job net status 300-S can be implemented in a format of any data structure, such as a table or an XML (Extensible Markup Language) compliant text.

In the example scenario, the job net status 300-S includes the information indicating that the first job 301 experienced a job failure and was not completed. For the second job 302, however, the start condition includes the completion of both the first job 301 and the fifth job 305. When the first job 301 ends abnormally, the network scheduler 110 obtains the job net status 300-S and transmits the job net status 300-S to the second computer 902 (step 430).

By this transmission, the job net status 300-S becomes available to a system administrator of the second computer 902. Using the job net status 300-S, the system administrator can identify why the second job 302 is not started as originally scheduled. Without information from other computers in the computer system, the system administrator might have to spend a lot of time to identify the error in the second computer 902 for which the system administrator is responsible. Optionally, a program running on the second computer 902 can facilitate the error analysis by creating a job failure alert A1. For example, the job failure alert A1 can initiate a corresponding pop-up window on the technical system administrator's user interface. In an alternative implementation, the alert A1 can be an audio signal, an e-mail message, an SMS (Short Message Service) message, or any other form of notification.

FIG. 2 is a flow chart showing a method 200 for creating a job failure alert in one implementation of the invention. The method 200 will be described in reference to the example of FIG. 1. In this implementation, the first computer 900 (i.e., a program running on the first computer) provides the job net 300 (step 202). The job net 300 can include representations of jobs of different computers, such as the second and third computers 901 and 902, respectively. The network scheduler 110 running on the first computer 900 starts the first job 301 on the second computer 901 (step 204). The first computer 900 receives a status of the first job 301 from the second computer 901 (step 205). The first computer 900 then determines the job net status 300-S (step 206). The first computer 900 can use the synchronization points SP-1 and SP-2 in the job net 300 to create a snap shot of each job's status. These job statuses can be included in the job net status 300-S.

A decision 208 is made based on the status of the jobs in the job net 300. In the example shown in FIGS. 1 and 2, the decision is based on possible failure of the first job. In an example scenario, the first computer 900 detects a failure of the first job 301 ("Yes" branch of the decision 208) and includes this information in the job net status 300-S. In an alternative scenario, both the first job 301 and the fifth job 305 are completed at the synchronization point SP-1. According to the dependencies D1 and D2, the completion of the jobs 301 and 305 are included in the start condition of the second job 302. In the alternative scenario, the start condition of the second job is fulfilled, because no job failure happened ("No" branch of the decision 208). In this case, the second job 302 is started in the third computer 902 (step 210).

In the example scenario, the first job 301 fails, and the first computer 900 transmits the job net status 300-S to the second computer 902 (step 212). Because the start condition is not fulfilled, the second job 302 is not started. Instead, the second computer 902 can create the job failure alert A1 (step 214). The job failure alert A1 notifies the technical system administrator of the second computer with the reason the second job 302 is not started.

Figure 3B:
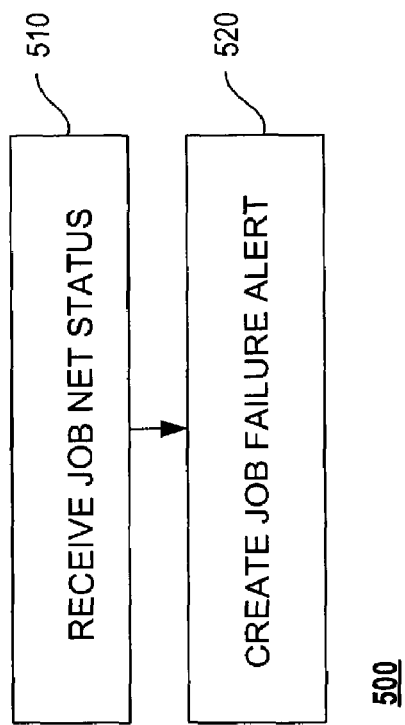
FIGS. 3A and 3B are flowcharts showing methods for error analysis in accordance with the invention.
Figure 3A:
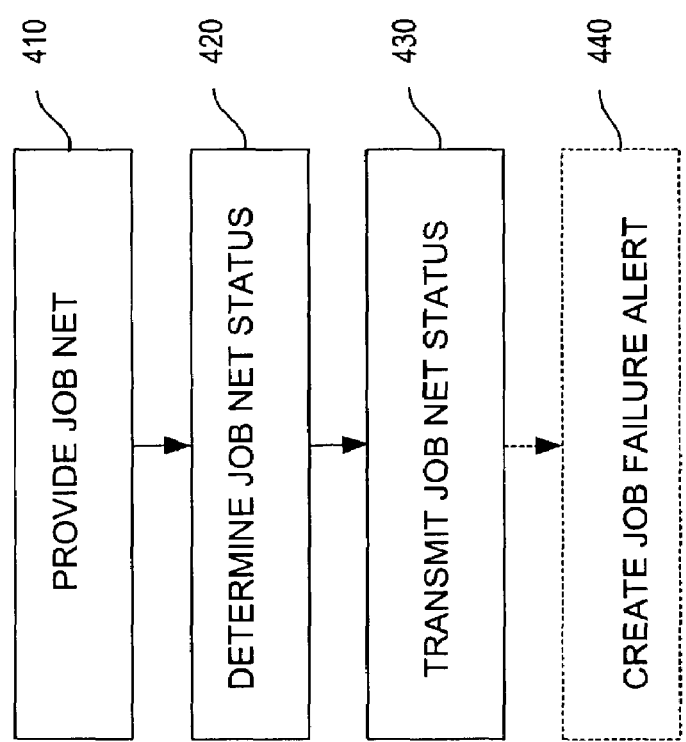

FIGS. 3A and 3B show methods 400 and 500 for error analysis in case of job failure. The methods 400 and 500 can be implemented in computer program products and executed, for example, by computers in a computer system such as shown in FIG. 1.

FIG. 3A shows the method 400 for error analysis in case of job failure in a computer system. The method 400 will be described in reference to the example of FIG. 1. The method 400 includes the following steps: providing a job net (step 410), determining a job net status (step 420), and transmitting the job net status (step 430). Optionally, the method 400 can include creating a job failure alert (step 440).

In step 410, a job net 300 is provided. For example, a scheduler can obtain the job net by reading a data file from a local or remote file system, by reading records from a database, by receiving data input by a user at a command line or graphical user interface, by receiving the information from local job administration programs (e.g., batch control processors) of the one or more computers that execute the jobs, or by any combination of these or other means of obtaining information. The job net 300 specifies that starting a second job 302 in the third computer 902 is dependent on the completion of a first job 301 in the second computer 901.

In step 420, a job net status 300-S of the job net 300 is determined. This step 420 can be performed at a predefined synchronization point SP-1. In step 430, the job net status 300-S is transmitted to the second computer 902. This can be done at periodically, or it can be done when some failure occurs, e.g., in case the first job 301 fails, i.e., when it is certain that job 302 will not be started. This condition can also arise when an upstream job, e.g., job 303, fails. The steps 410–440 can be executed by any computer in the computer system.

FIG. 3B shows the method 500 for error analysis in case of job failure in a computer system. This will be described in reference to the example computer system of FIG. 1, which includes a second computer 901 and a third computer 902. The method 500 includes receiving job net status (step 510) and creating job failure alert (step 520). In the receiving step 510, the third computer 902 receives a job net status 300-S of a job net 300 from, for example, a first computer 900 of the computer system. The job net 300 defines the start of a second job 302 in the third computer 902 to be dependent on the completion of a first job 301 in the second computer 901. The job net status 300-S indicates the unsuccessful termination of the first job 301. A job failure alert is created (step 520) on the second computer 902.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The computers and computer systems of the computer network can be interconnected by any form or medium of digital data communication. Examples of communication networks include a local area network ("LAN"), a wide area network ("WAN"), and the Internet.

The invention has been described in terms of particular embodiments. Other embodiments are within the scope of the following claims. For example, the steps of the invention can be performed in a different order and still achieve desirable results.

What is claimed is:

1. A method for error analysis in case of job failure in a computer system having at least a first computer and a second computer, the method comprising:
   providing a job net, wherein the job net defines the start of a second job of the second computer to be dependent on the successful completion of a first job in the first computer;
   determining a job net status of the job net;
   and in case of unsuccessful termination of the first job, transmitting the job net status to the second computer, the job net status notifying the second computer that the second job will not be started.

2. The method of claim 1, wherein:
   determining the job net status is performed at a predefined synchronization point of the job net; and
   the job net includes a representation of the predefined synchronization point.

3. The method of claim 1 further comprising:
   creating a job failure alert on the second computer.

4. The method of claim 1, wherein:
   the job net status includes the status of all jobs in the job net that have run up to the time the job net status is determined.

5. The method of claim 1, wherein:
   determining the job net status is performed at a predefined synchronization point of the job net, the synchronization point having been inserted in the job net by a person creating or maintaining the job net; and
   determining the job net status comprises having a network scheduler determine the status of all jobs in the job net that have run up to the time of determining the job net status.

6. The method of claim 5, wherein the network scheduler runs on a third computer, and wherein the first, the second, and the third computer are three separate computers.

7. A method for error analysis in case of job failure in a computer system having at least a first computer and a second computer, the method comprising:
   receiving in the second computer a job net status of a job net, wherein the job net defines the start of a second job in the second computer to be dependent on the successful completion of a first job in the first computer, the job net status notifying the second computer that the second job will not be started;
   and determining whether the job net status indicates the unsuccessful termination of the first job and, if it does, creating a job failure alert on the second computer.

8. A computer program product, tangibly embodied in a machine-readable storage device, for error analysis in case of job failure in a computer system that has at least a first computer and a second computer, the computer program product comprising instructions operable to cause data processing apparatus to:
   provide a job net, wherein the job net defines the start of a second job in the second computer to be dependent on the successful completion of a first job in the first computer;
   determine a job net status of the job net;
   and in case of unsuccessful termination of the first job, transmit the job net status to the second computer, the job net status notifying the second computer that the second job will not be started.

9. The computer program product of claim 8, wherein:
   the job net status is determined at a predefined synchronization point of the job net; and
   the job net includes a representation of the predefined synchronization point.

10. The computer program product of claim 8, wherein:
    the job net status includes the status of all jobs in the job net that have run up to the time the job net status is determined.

11. The computer program product of claim 8, wherein:
    instructions to determine the job net status are executed at a predefined synchronization point of the job net, the synchronization point having been inserted in the job net by a person creating or maintaining the job net; and
    instructions to determine the job net status comprise instructions in a network scheduler to determine the status of all jobs in the job net that have run up to the time of determining the job net stats.

12. The computer program product of claim 11, wherein the network scheduler runs on a third computer, and wherein the first, the second, and the third computer are three separate computers.

13. A computer program product, tangibly embodied in a machine-readable storage device, for error analysis in case of job failure in a computer system that has at least a first computer and a second computer, the computer program product comprising instructions operable to cause data processing apparatus to:
    receive on the second computer a job net status of a job net, wherein the job net defines the start of a second job in the second computer to be dependent on the successful completion of a first job in the first computer, the job net status indicating the unsuccessful termination of the first job, the job net status notifying the second computer that the second job will not be started;
    and create a job failure alert on the second computer.

14. A computer system for error analysis in case of job failure, wherein the computer system has at least a first computer and a second computer, the computer system comprising:
    a memory storing a job net, wherein the job net defines the start of a second job in the second computer to be dependent on the successful completion of a first job in the first computer;
    a processor configured to determine a job net status of the job net, and, in case of unsuccessful termination of the first job, to transmit the job net status to the second computer, the job net status notifying the second computer that the second job will not be started.

15. The computer system of claim 14, wherein the processor is configured to determine the job net status at a predefined synchronization point of the job net.

16. The computer system of claim 15, wherein the job net includes a representation of the predefined synchronization point.

17. The computer system of claim 14, wherein the second computer is configured to create a job failure alert.

* * * * *